Sept. 13, 1927.

H. PILLING

PRESSURE REGULATOR

Filed Sept. 20, 1926

1,642,216

H. Pilling
inventor
By Marks & Clerk
Atty.

Patented Sept. 13, 1927.

1,642,216

UNITED STATES PATENT OFFICE.

HENRY PILLING, OF CHORLTON, MANCHESTER, ENGLAND.

PRESSURE REGULATOR.

Application filed September 20, 1926, Serial No. 136,650, and in Great Britain September 24, 1925.

This invention has for its object to provide improved means for maintaining within close limits any desired pressure within pipes or vessels supplied from a source under a higher pressure. The invention is applicable for the regulation of gases or fluids but is particularly intended for use for the regulation or control of the pressure of the steam in a low pressure system supplied from a system, such as a boiler, under a higher pressure.

Referring to the accompanying explanatory drawings:—

Figure 1:
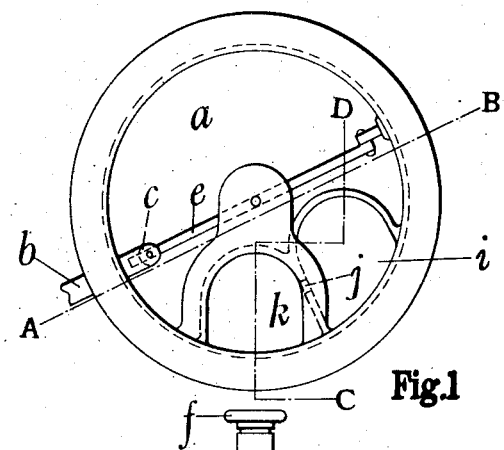
Figure 2:
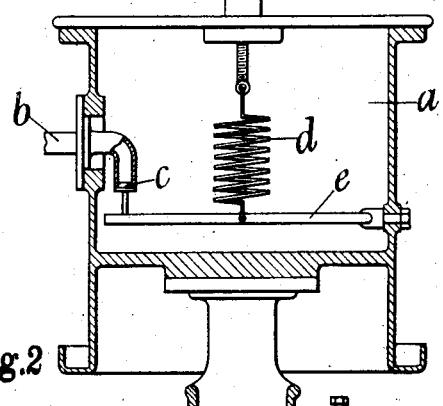
Figure 3:
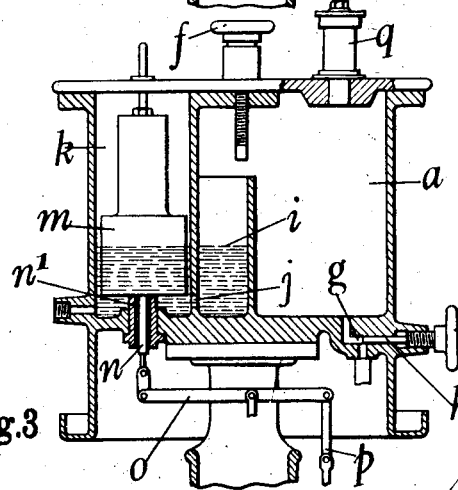

Figures 1, 2 and 3 illustrate one convenient construction of pressure regulator in accordance with my invention, Figure 1 being a plan view with the cover removed, Figure 2 a sectional elevation on the line A B, Figure 1, and Figure 3 a sectional elevation on the line C D of Figure 1.

The same reference letters in the three views indicate the same or similar parts.

The low pressure pipe or like system, the pressure in which is to be maintained constant or approximately so, communicates with a vessel $a$ by way of a pipe $b$ having a valve $c$ thereon loaded by the spring $d$ through the lever $e$. The tension of the spring $d$ can be adjusted by means of the hand wheel $f$. An outlet from the chamber $a$ is provided at $g$ controlled by a valve $h$, hereinafter termed the leak off valve. The valve allows of the escape at an adjustable rate of the contents of the vessel $a$.

Within the vessel $a$ is provided a compartment $i$ which is open to the pressure in $a$ and which communicates by way of the aperture $j$ with a chamber $k$ open to the atmosphere and containing a float $m$. Mercury or other suitable liquid is provided in the intercommunicating compartment $i$ and chamber $k$. The float $m$ has a stem $n$ which passes freely through a sleeve $N^1$ which extends up the hollow inside of the float to a height above the maximum level of the mercury. The stem is connected to a lever $o$ which is coupled to suitable means for controlling either the rate of entry of steam or fluid (hereinafter termed steam) to the low pressure system or the rate of escape of steam from such system, or both the rate of entry to and escape from the low pressure system. In the example, illustrated, the lever $o$ is connected to the pilot valve of a servo motor cylinder, the link $p$ forming part of said pilot valve.

The operation of the arrangement is as follows: If the pressure in the low pressure system exceeds a predetermined maximum, which is determined by the tensioning of the spring $d$, the valve $c$ will be opened and steam will enter the vessel $a$. The valve $h$ is set to allow of a continuous outflow from the vessel either to atmosphere or to a condenser. Any accumulation of pressure in $a$ will cause a flow of mercury or other fluid from the compartment $i$ to the chamber $k$ and the consequent raising of the float $m$ and operation of the lever $o$ and the valve or other system connected therewith. When the valve $c$ closes, the pressure in $a$ is released through the outlet $g$, and the mercury or other fluid level in the chamber $k$ falls to normal, and the valve gear or the like operated from the lever $o$ is put out of action.

A relief valve $q$ prevents any excessive accumulation of pressure in $a$. The device works with small pressures in the vessel $a$ and the valve $q$ may be set to open under, for example, a pressure of about two inches of mercury.

By adjusting the tension of the spring $d$ and varying the size of the leak off outlet past the valve $h$, any desired mean pressure can be maintained within close limits within the low pressure system.

The vessel $a$ may have a drain pipe with a steam trap thereon to allow of the discharge of the water of condensation from the vessel.

I do not limit myself to any particular application of the regulator hereinbefore described. It may be used in place of or as an ordinary steam reducing valve, or a relief valve or in conjunction with a non-condensing engine where the exhaust steam is used in a works, for heating or other services and where it is desirable to maintain a certain prescribed low pressure in the exhaust steam utilisation appliances or pipes.

It is to be understood that the term fluid in the appended claims is intended to include gases, vapours and liquids.

I am aware that it has heretofore been proposed to increase the opening of a safety valve by loading the same through a pivoted beam, having inter-communicating vessels at its ends, an increase in pressure above a predetermined maximum allowing pressure to be applied in one vessel whereby liquid is displaced therefrom to the other vessel and the load on the valve reduced.

What I claim is:—

1. In a fluid pressure regulators, the combination with a vessel open to atmospheric pressure through a restricted connection, and having a valve controlled communication with the system in which a low pressure is to be maintained, and with a chamber open to the atmosphere into which a liquid is displaced from the said vessel when the pressure therein rises, of a float in said chamber connected to means for varying the rate of fluid flow to and from said system, as set forth.

2. In fluid pressure regulators as claimed in claim 1, the provision of adjustable means for allowing of the continuous escape of fluid from said vessel, as set forth.

In testimony whereof I have signed my name to this specification.

HENRY PILLING.